(12) United States Patent
Ishikawa et al.

(10) Patent No.: US 9,435,505 B2
(45) Date of Patent: Sep. 6, 2016

(54) TILT SENSOR HOUSING CASE AND VEHICLE LAMP SYSTEM

(71) Applicant: KOITO MANUFACTURING CO., LTD., Tokyo (JP)

(72) Inventors: Masaaki Ishikawa, Shizuoka (JP); Yusuke Kasaba, Shizuoka (JP); Masashi Yamazaki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/694,384

(22) Filed: Apr. 23, 2015

(65) Prior Publication Data

US 2015/0308645 A1    Oct. 29, 2015

(30) Foreign Application Priority Data

Apr. 24, 2014  (JP) .................. 2014-090306

(51) Int. Cl.
```
F21S 8/10      (2006.01)
G01C 9/02      (2006.01)
B60Q 1/076     (2006.01)
B60Q 1/10      (2006.01)
```
(52) U.S. Cl.
CPC .......... *F21S 48/1742* (2013.01); *B60Q 1/076* (2013.01); *B60Q 1/10* (2013.01); *G01C 9/02* (2013.01); *B60Q 2300/132* (2013.01)

(58) Field of Classification Search
CPC ..... B60Q 1/076; B60Q 1/10; F21S 48/1742; G01C 9/02
See application file for complete search history.

(56) References Cited

U.S. PATENT DOCUMENTS

2004/0264208 A1* 12/2004 Nishizawa ............. B60Q 1/076
                                                      362/514

FOREIGN PATENT DOCUMENTS

JP    2012-030782 A    2/2012
JP    2012-030783 A    2/2012

* cited by examiner

*Primary Examiner* — Mary Ellen Bowman
(74) *Attorney, Agent, or Firm* — Osha Liang LLP (57) ABSTRACT

A tilt sensor housing case includes a main body part including a housing space and an opening portion and a lid part configured to close the opening portion. The lid part has a first engaging portion extending along an outer surface of the main body part. The main body part has a second engaging portion on the outer surface corresponding to the first engaging portion. The lid part is mounted to the main body part by a snap-fit coupling using the elasticity of the lid part and locked to the main body part by the engagement of the first and second engaging portions. The main body part has a first protrusion and a second protrusion that are positioned to sandwich the first engaging portion between them, and each of the first and second protrusions protrudes at least up to the same height as the first engaging portion.

4 Claims, 5 Drawing Sheets

TILT SENSOR HOUSING CASE AND VEHICLE LAMP SYSTEM

CROSS-REFERENCE TO RELATED APPLICATION

The present application claims priority from Japanese Patent Application No. 2014-090306 filed on Apr. 24, 2014, the entire content of which is incorporated herein by reference.

BACKGROUND

1. Technical Field

The present disclosure relates to a tilt sensor housing case and a vehicle lamp system. More particularly, the present disclosure relates to a tilt sensor housing case provided in a vehicle such as an automobile, and a vehicle lamp system including a tilt sensor housed in the tilt sensor housing case.

2. Related Art

An auto-leveling control changes an irradiation direction of a vehicle headlamp by automatically adjusting a position of an optical axis of the vehicle headlamp in accordance with a tilt angle of a vehicle. Generally, in the auto-leveling control, the position of the optical axis of the headlamp is adjusted, on the basis of a pitch angle of a vehicle. The pitch angle is derived from an output value of a vehicle height sensor. On the other hand, Patent Documents 1 and 2 disclose a vehicle lamp control device for implementing the auto-leveling control using a tilt sensor such as an acceleration sensor.

PRIOR ART LITERATURE

Patent Document

Patent Document 1: Japanese Patent Laid-Open Publication No. 2012-030782
Patent Document 2: Japanese Patent Laid-Open Publication No. 2012-030783

A tilt sensor such as an acceleration sensor, a gyro sensor (an angular velocity sensor and an angular acceleration sensor) or a geomagnetic sensor is mounted to a vehicle body in a state of being housed in a case. There is a possibility that a worker accidentally drops the tilt sensor housing case at the time of mounting the tilt sensor housing case to the vehicle body. Therefore, the tilt sensor housing case is required to have a property that is less broken by the impact due to dropping.

SUMMARY

Exemplary embodiments of the invention provide a tilt sensor housing case and a vehicle lamp system which is less damaged.

One aspect of the present invention provides a tilt sensor housing case. The tilt sensor housing case comprises:
a main body part comprising a housing space for a substrate on which a tilt sensor is mounted and an opening portion for inserting the substrate in the housing space; and
a lid part configured to close the opening portion,
wherein the lid part has a first engaging portion extending along an outer surface of the main body part in a state where the lid part is mounted to the main body part,
the main body part has a second engaging portion on the outer surface corresponding to the first engaging portion,
the lid part is mounted to the main body part by a snap-fit coupling using the elasticity of the lid part and locked to the main body part by the engagement of the first engaging portion and the second engaging portion, and
the main body part has a first protrusion and a second protrusion that are positioned to sandwich the first engaging portion between them in a state where the lid part is mounted to the main body part, and each of the first and second protrusions protrudes at least up to the same height as the first engaging portion in a direction in which the outer surface and the first engaging portion are overlapped. According to this aspect, the tilt sensor housing case can be less damaged.

One of the first engaging portion and the second engaging portion may have an engaging claw and the other thereof may have an engaging protrusion protruding toward the first engaging portion, and the first engaging portion and the second engaging portion may be engaged with each other by an uneven lance engagement of the engaging claw and the engaging protrusion In this way, the lid part can be simply attached to the main body part. the main body part comprises a guide rail on an inner surface in contact with the housing space, the guide rail extending in an insertion direction of the substrate and supporting an edge of the substrate, The engaging claw may have a first arm portion, a second arm portion and a connecting portion connecting leading ends of the first arm portion and the second arm portion, the first arm portion and the second arm portion being spaced apart in a direction perpendicular to the insertion direction and extending in the insertion direction, and one of the first arm portion and the second arm portion, which is close to the guide rail, may be thicker than the other of the first arm portion and the second arm portion. According to this aspect, the tilt sensor housing case can be less damaged in a reliable manner.

Another aspect of the present invention provides a vehicle lamp system. The vehicle lamp system comprises:
a vehicle lamp having an optical axis that can be adjusted;
the tilt sensor housing case according to any one of the above tilt sensor housing cases;
a tilt sensor housed in the tilt sensor housing case, the tilt senor configured to calculate a tilt angle of a vehicle; and
a control device that generates information on the tilt angle of the vehicle by using an output value of the tilt sensor and controls the adjustment of the optical axis of the vehicle lamp by using the information. According to this aspect, the tilt sensor housing case that is less damaged allows the tilt sensor in the case to be attached to the vehicle body with high accuracy. Accordingly, it is possible to improve the accuracy of the auto-leveling control of the vehicle lamp.

A proper combination of respective parts described above can be also included in the scope of the invention to be protected by the present patent application.

According to the present invention, it is possible to provide a technique for allowing a tilt sensor housing case to be less damaged.

DETAILED DESCRIPTION

Hereinafter, an exemplary embodiment of the present invention will be described with reference to the drawings. The same or similar elements, members and process shown in each of the drawings are denoted by the same or similar reference numerals and a duplicated description thereof will be omitted, as appropriate. Further, the embodiment is illustrative and not intended to limit the present invention. It should be noted that all the features and their combinations described in the embodiment are not necessarily considered as an essential part of the present invention.

Figure 1:
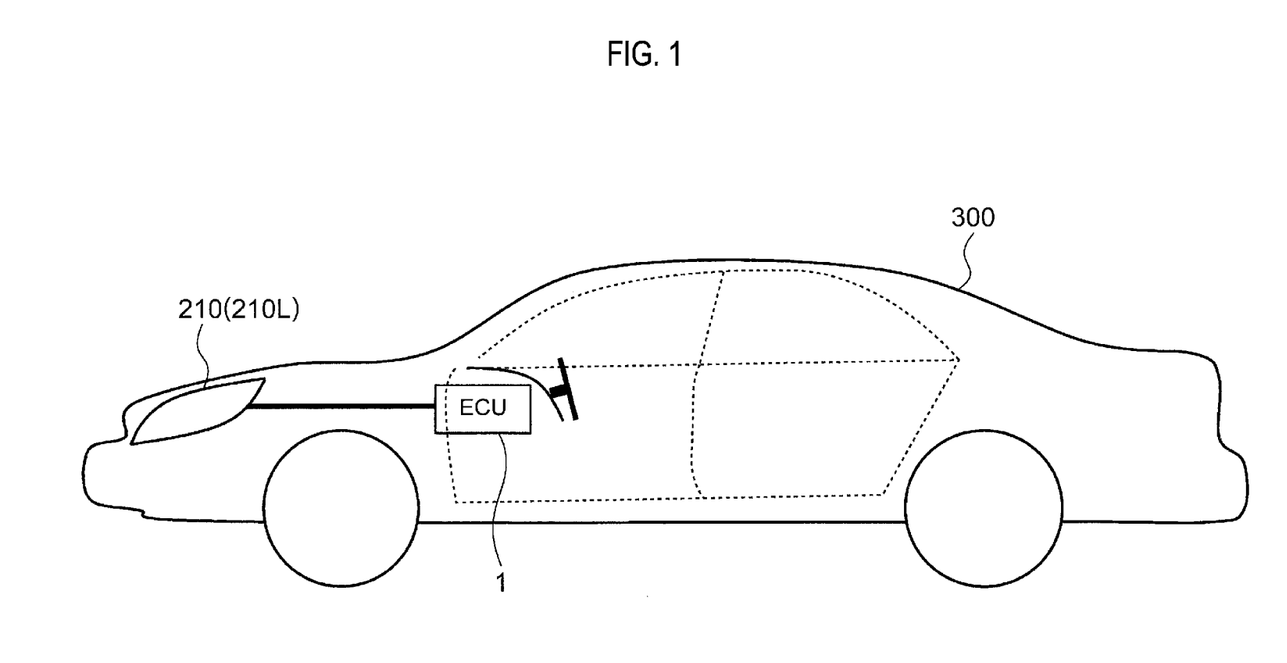
FIG. 1 is a schematic view for explaining a mounting position of a tilt sensor housing case according to an exemplary embodiment.

FIG. 1 is a schematic view for explaining a mounting position of a tilt sensor housing case according to an exemplary embodiment. A tilt sensor housed in the tilt sensor housing case is included in a leveling ECU 1. The leveling ECU 1 is installed, for example, near a dashboard of a vehicle body 300. Meanwhile, a mounting position of the leveling ECU 1 or the tilt sensor housing case is not particularly limited. For example, the leveling ECU 1 or the tilt sensor housing case may be provided in a headlamp unit 210. When being instructed to implement an auto-leveling control from a light switch or the like mounted, for example, in a vehicle, the leveling ECU 1 starts to implement the auto-leveling control.

In the auto-leveling control, the leveling ECU 1 generates information on a tilt angle in a pitch direction of a vehicle by using an output value of the tilt sensor. Then, the leveling ECU 1 controls a leveling actuator 226 (see FIG. 2) by using the information obtained and adjusts an optical axis of a lamp unit 10 (see FIG. 2) as a vehicle lamp mounted to the headlamp unit 210 in an angle corresponding to a vehicle posture. In this way, the auto-leveling control for implementing, in real time, the leveling adjustment of the lamp unit 10 on the basis of the vehicle posture is carried out. As a result, it is possible to optimally adjust a reaching distance of a front irradiation light even when the vehicle posture is changed.

Figure 2:
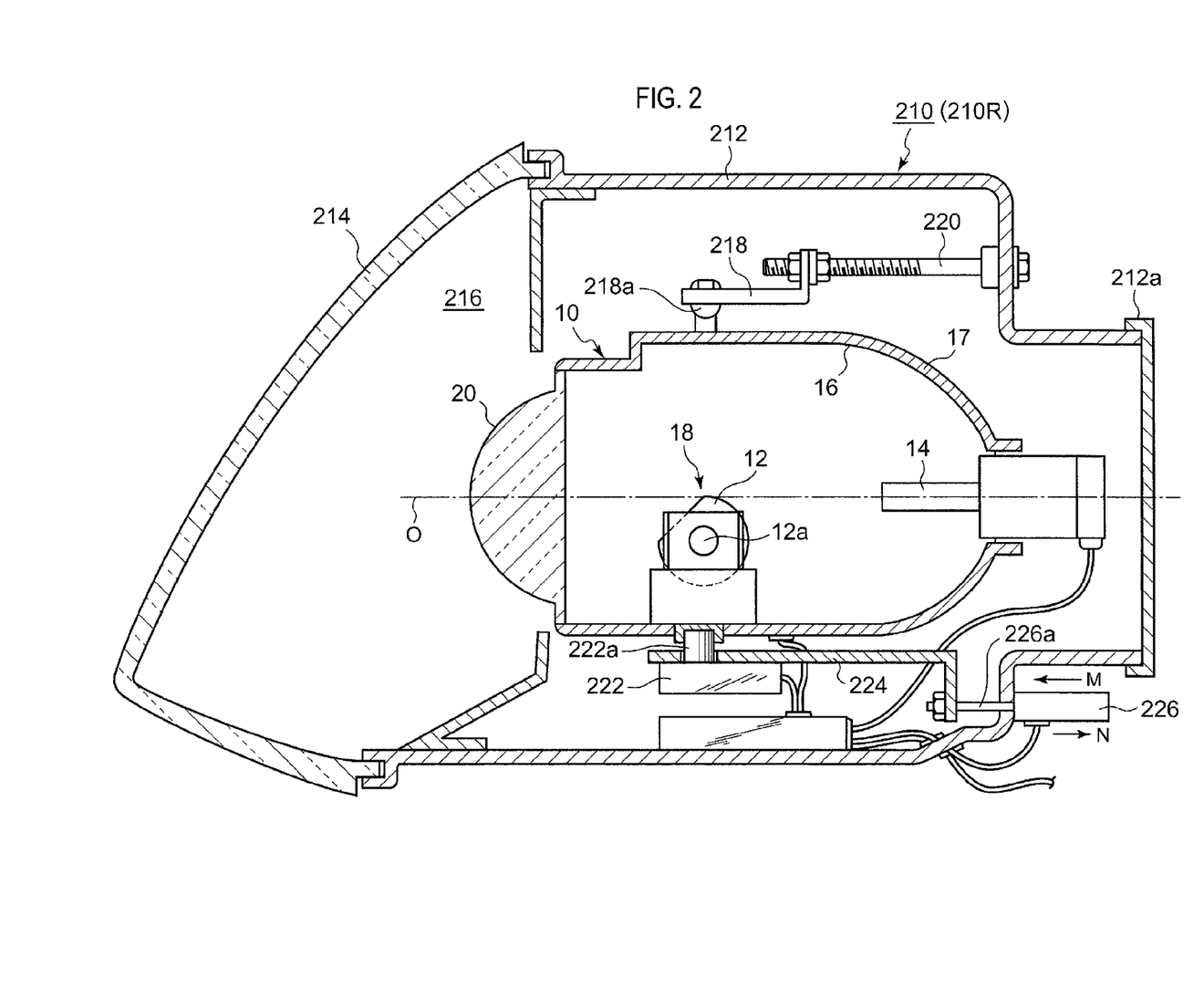
FIG. 2 is a schematic vertical sectional view of a headlamp unit including a vehicle lamp.

FIG. 2 is a schematic vertical sectional view of the headlamp unit including the vehicle lamp. The headlamp unit 210 has a structure where a pair of headlamp units is disposed one by one at left and right sides in a vehicle width direction of a vehicle. The pair of headlamp units is formed in a bilaterally symmetrical manner. A right headlamp unit 210R has a structure substantially the same as a left headlamp unit 210L. Accordingly, in the following, a structure of the right headlamp unit 210R will be described.

The headlamp unit 210 includes a lamp body 212 having an opening portion on the front side of a vehicle and a translucent cover 214 covering the opening portion. The lamp body 212 has a removable cover 212a on the rear side of a vehicle. A lamp chamber 216 is formed by the lamp body 212 and the translucent cover 214. The lamp unit 10 is accommodated in the lamp chamber 10.

A lamp bracket 218 is connected to the lamp unit 10. The lamp bracket 218 has a swing mechanism 218a that is a swing center in a vertical direction and a lateral direction of the lamp unit 10. The lamp bracket 218 is screwed to an aiming adjustment screw 220 supported to the lamp body 212. A rotation shaft 222a of a swivel actuator 222 is fixed to a lower surface of the lamp unit 10. The swivel actuator 222 is fixed to a unit bracket 224. The leveling actuator 226 is connected to the unit bracket 224. For example, the leveling actuator 226 is configured by a motor or the like that expands and contracts a rod 226a in directions indicated by arrows M, N. As the rod 226a is expanded and contracted in the directions indicated by the arrows M, N, the lamp unit 10 is switched to a backward tilting posture and a forward tilting posture. In this way, a leveling adjustment for making downward and upward, a pitch angle of the optical axis O of the lamp unit 10 can be performed.

The lamp unit 10 includes a shade mechanism 18 having a rotating shade 12, a light source 14, a lamp housing 17 for supporting a reflector 16 on an inner wall thereof and a projection lens 20. As the light source 14, an incandescent bulb, a halogen lamp, a discharge bulb, an LED and the like can be used. At least a portion of the reflector 16 has an ellipse spherical shape. The reflector 16 reflects light emitted from the light source 14. The light emitted from the light source 14 and reflected by the reflector 16 is partially guided to the projection lens 20 via the rotating shade 12. The rotating shade 12 is a cylindrical member that can be rotated about a rotation shaft 12a. The rotating shade 12 includes a cutout portion and a plurality of shade plates (not shown). One of the cutout portion or the shade plates is moved on the optical axis O, so that a predetermined light distribution pattern is formed. The projection lens 20 is a plano-convex aspherical lens. The projection lens 20 is adapted to project a light source image formed on a rear focal plane, as an inverted image, on a virtual vertical screen in the front of the lamp.

Figure 3:
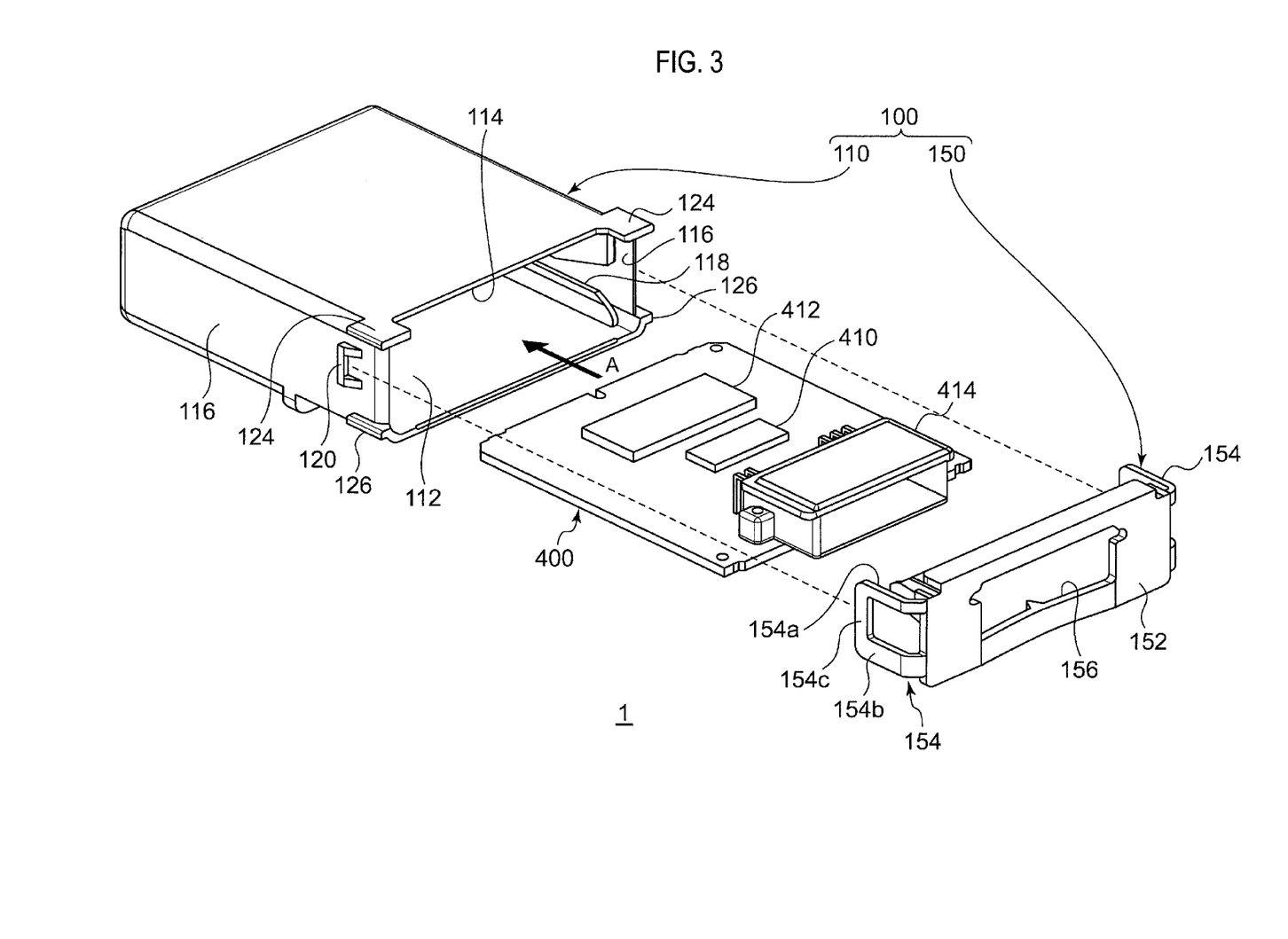
FIG. 3 is an exploded perspective view showing a schematic structure of a leveling ECU including the tilt sensor housing case according to the exemplary embodiment.
Figure 4:
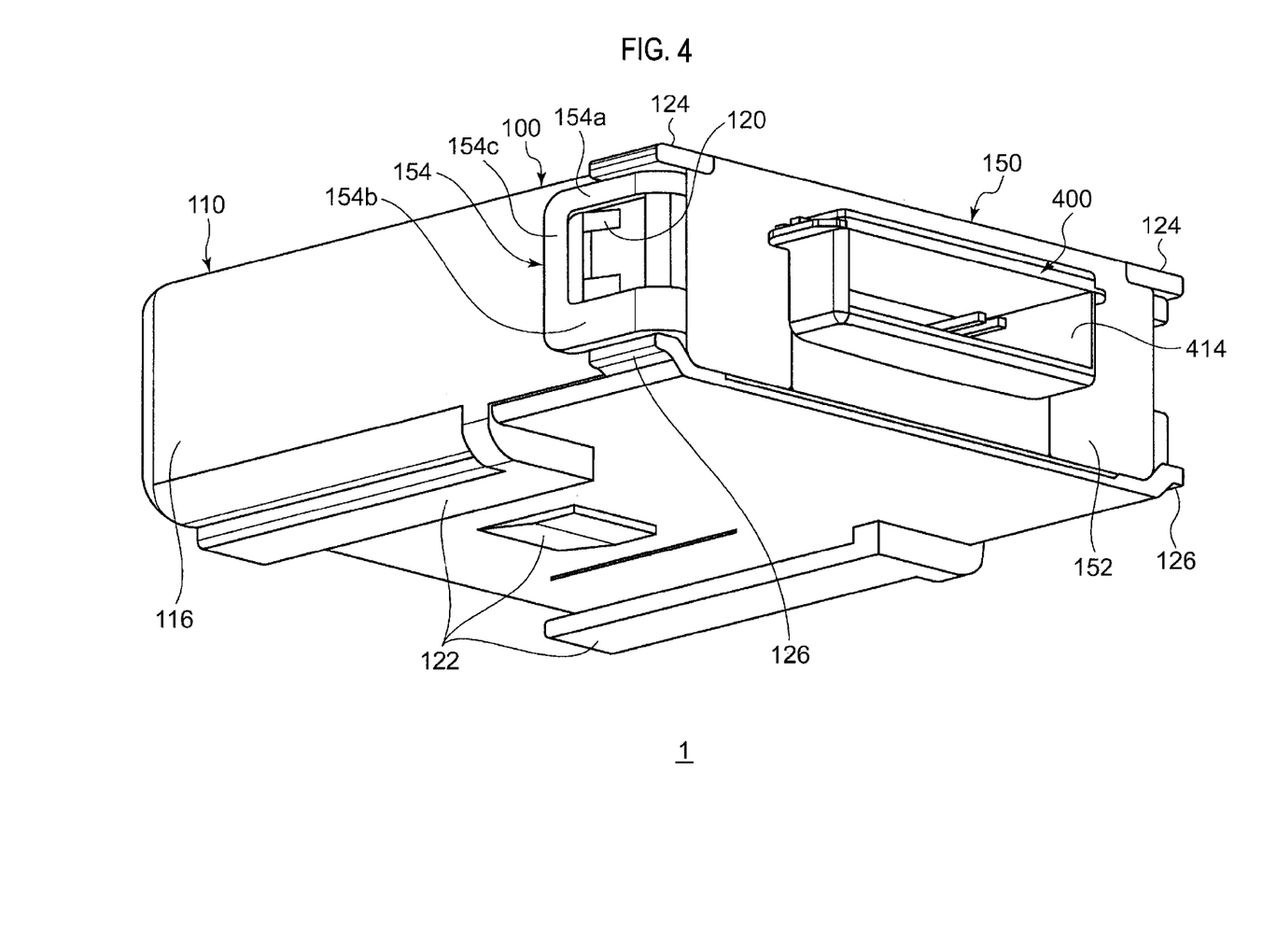
FIG. 4 is a perspective view showing a schematic structure of the leveling ECU, as seen obliquely from below.
Figure 5:
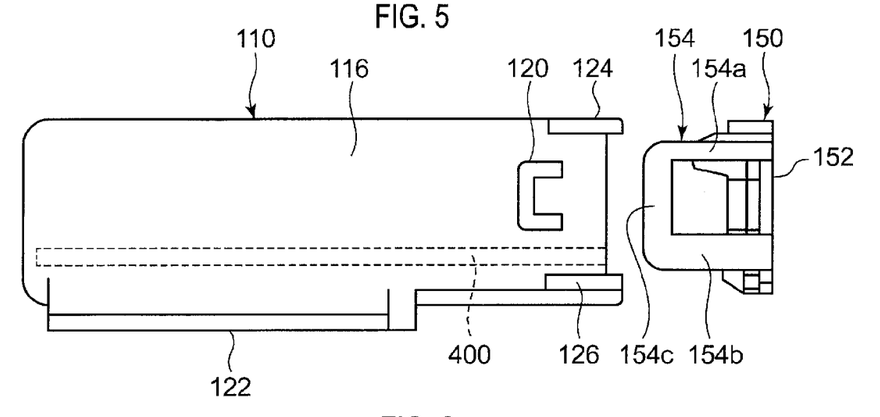
FIG. 5 is a schematic view of the leveling ECU, as seen from side.

Subsequently, a tilt sensor housing case according to an exemplary embodiment will be described in detail. FIG. 3 is an exploded perspective view showing a schematic structure of a leveling ECU including the tilt sensor housing case according to the exemplary embodiment. FIG. 4 is a perspective view showing a schematic structure of the leveling ECU, as seen obliquely from below. FIG. 5 is a schematic view of the leveling ECU, as seen from side. In the following description, for convenience, a normal direction of the side wall 116 refers to a lateral direction of a tilt sensor housing case 100. A direction parallel to the main surface of the tilt sensor housing case 100 and the side walls 116, i.e., the insertion direction of the substrate 400 refers to a longitudinal direction of the tilt sensor housing case 100. A normal direction of the main surface of the tilt sensor housing case 100 refers to a vertical direction of the tilt sensor housing case 100.

The leveling ECU 1 includes the tilt sensor housing case 100, a tilt sensor 410, the substrate 400 and a CPU 412 as a control device. The tilt sensor 410 is mounted on the substrate 410. A predetermined wiring pattern is provided in a main surface of the substrate 400. On the substrate 400, the tilt sensor 410, the CPU 412, a ROM for storing various control programs, a RAM used as a work area for storing a data or executing a program, an input interface (Input I/F) for monitoring an input voltage to the substrate 400, inputting a signal from various switches or the like and executing communication therewith, an output interface (Output I/F) for outputting a control signal to the leveling actuator 226 and executing communication therewith, and a memory, or the like are mounted. Further, a connector 414 is mounted on the substrate 400. The connector 414 is provided for inputting a vehicle speed signal and a light switch signal and the like from a vehicle or outputting the information generated to the outside. In the present embodiment, the substrate 400 has a rectangular shape, as seen in a plan view. The connector 414 is provided at one side of the substrate 400.

The tilt sensor 410 is a sensor for calculating a tilt angle of a vehicle. In the present embodiment, the tilt sensor 410 is configured by an acceleration sensor. The CPU 412 generates information on the tilt angle of the vehicle by using an output value of the tilt sensor 410. The CPU 412 controls the adjustment for the optical axis of the vehicle unit 10 by using the information generated. In the present embodiment, the leveling ECU 1 has a sensor-CPU integral structure where the tilt sensor 410 and the CPU 412 are mounted on the same substrate 400. The present invention is not particularly limited thereto. For example, the leveling ECU 1 may have a structure where the CPU 412 is mounted on a separate substrate different from the tilt sensor 410. Namely, the leveling ECU 1 may have a structure where the CPU 412 is a component configured separately from a tilt sensor device. Here, the tilt sensor device is configured by the tilt sensor housing case 100 and the substrate 400 on which the tilt sensor 410 is mounted.

The tilt sensor housing case 100 has a flat rectangular parallelepiped shape. The tilt sensor housing case 100 includes a main body part 110 and a lid part 150. The main body part 110 is a container-like member that has a housing space 112 for the substrate 400. The main body part 110 has an opening portion 114 for inserting the substrate 400 in the housing space 112. The opening portion 114 is provided at a surface of the main body part corresponding to a side wall of the tilt sensor housing case 100. Further, the main body part 110 has guide rails 118 provided at inner surfaces of two side walls 116. The two side walls 116 intersect an extension direction of the opening portion 114 and are opposed to each other. The guide rails 118 extend in an insertion direction of the substrate 400 (a direction indicated by an arrow A in FIG. 3, in other words, a longitudinal direction). The substrate 400 is inserted along the guide rails 118 into the housing space 112 through the opening portion 114 from an end opposite to the connector 414. An edge (two edges extending parallel to the insertion direction of the substrate 400 and opposed to each other) of the substrate 400 is supported by the guide rails 118 in a state where the substrate 400 is housed in the housing space 112.

Second engaging portions 120 are provided at positions close to the opening portion 114 in the outer surfaces of two side walls 116 of the main body part 110. The second engaging portions 120 are engaged with the first engaging portions 154 of the lid part 150. In the present embodiment, the second engaging portion 120 is configured by an engaging protrusion. The engaging protrusion protrudes toward the first engaging portion from the outer surface of the side wall 116 in a state where the lid part 150 is mounted to the main body part 110. A bracket engaging portion 122 is provided in one main surface of the main body part 110. One end of an ECU bracket 600 (see FIG. 6) is engaged to the bracket engaging portion 122 and the other end of the ECU bracket 600 is engaged to the vehicle body. In this way, the tilt sensor housing case 100 and thus the leveling ECU 1 are mounted to the vehicle body. Further, the main body part 110 has first protrusions 124 and second protrusions 126, which are provided for preventing the damage to the first engaging portion 154. The first protrusions 124 and the second protrusions 126 are respectively provided in the vicinity of each of the second engaging portions 120. The shape or arrangement or the like of the first protrusions 124 and the second protrusions 126 will be described in detail later.

The lid part 150 is a member for closing the opening portion 114 of the main body part 110. The lid part 150 includes a wall portion 152 and two first engaging portions 154. The wall portion 152 is fitted into the opening portion 114 and constitutes one of the side walls of the tilt sensor housing case 100. Further, the wall portion 152 has an opening portion 156 for allowing the connector 414 of the substrate 400 housed in the main body part 110 to protrude to the outside. The first engaging portions 154 are provided at both ends of the wall portion 152. Each of two first engaging portions 154 extends along an outer surface of the side wall 116 of the main body part 110 in a state where the lid part 150 is mounted to the main body part 110. Accordingly, the side wall 116 and the first engaging portions 154 are opposed to each other at both left and right sides of the tilt sensor housing case 100 sandwiching the opening portion 156.

In the present embodiment, the first engaging portion 154 is configured by an engaging claw. The engaging claw is configured by a first arm portion 154a, a second arm portion 154b and a connecting portion 154c. Each of the first arm portion 154a and the second arm portion 154b extends in a longitudinal direction, i.e., in an insertion direction of the substrate 400. Further, both arm portions 154a and 154b are spaced apart from each other in a vertical direction, i.e., in a direction perpendicular to the insertion direction of the substrate 400. The connecting portion 154c connects the leading ends of the first arm portion 154a and the second arm portion 154b. Accordingly, the first engaging portion 154 configured by the engaging claw has an opening portion that is formed by an end of the wall portion 152, the first arm portion 154a, the second arm portion 154b and the connecting portion 154c. The second engaging portion 120 configured by an engaging protrusion is fitted into the opening portion.

After the substrate 400 is housed in the housing space 112 of the main body part 110, the lid part 150 is fitted into the opening portion 114. The lid part 150 is mounted to the main body part 110 by a snap-fit coupling using the elasticity of the lid part 150. Further, together with the snap-fit coupling of the lid part 150 to the main body part 110, the first engaging portion 154 is engaged with the second engaging portion 120 and thus the lid part 150 is locked to the main body part 110.

Specifically, the lid part 150 is aligned with the main body part 110 so that the connector 414 is inserted through the opening portion 156. Thus, the wall portion 152 is pushed to approach the opening portion 114. As the lid part 150 is pushed toward the main body part 110, the connecting portion 154c of the first engaging portion 154 abuts against the second engaging portion 120. In this state, when the lid part 150 is further pushed toward the main body part 110, the connecting portion 154c of the first engaging portion 154 is urged outwardly by the second engaging portion 120. In this way, the lid part 150 is elastically deformed and two first engaging portions 154 are displaced in a direction away from each other.

When the lid part 150 is further pushed toward the main body part 110 and thus the wall portion 152 is fitted into the opening portion 114, the connecting portion 154c is in a state of getting over the second engaging portion 120. Then, the pressing of the connecting portion 154c by the second engaging portion 120 is released, so that the lid part 150 returns, by its elasticity, to a state before the displacement. In this way, the second engaging portion 120 is fitted into an opening portion that is formed by an end of the wall portion 152, the first arm portion 154a, the second arm portion 154b and the connecting portion 154c. As a result, the engaging claw of the first engaging portion 154 and the engaging protrusion of the second engaging portion 120 are engaged with each other by an uneven lance engagement. The connector 414 is exposed to the outside of the case from the opening portion 156. The connector 414 is connected to a harness 500 (see FIG. 6) for connecting the substrate 400 and an external device to each other.

In a state where the lid part 150 is mounted to the main body part 110, the first protrusions 124 and the second protrusions 126 are arranged in a state of interposing the first engaging portions 154 therebetween. Namely, the first protrusions 124 are disposed on one main surface of the tilt sensor housing case 100 and the second protrusions 126 are disposed on the other main surface (in the present embodiment, a surface where the bracket engaging portion 122 is provided) thereof. Further, the first protrusions 124 are provided at corners where one main surface of the main body part 110, the side wall 116 and the wall portion 152 of the lid part 150 are in contact with each other. Similarly, the second protrusions 126 are provided at corners where the other main surface of the main body part 110, the side wall 116 and the wall portion 152 are in contact with each other.

The first protrusions 124 and the second protrusion 126 are protruded to the outside of the first engaging portion 154 in an overlapping direction of the outer surface of the side wall 116 and the first engaging portion 154, i.e., in a lateral direction of the tilt sensor housing case 100. Further, the end surfaces on the lid part 150 side of the first protrusions 124 and the second protrusion 126 are located flush with the wall portion 152 of the lid part 150. In other words, the first protrusions 124 are provided at corners so as to cover the first engaging portions 154, as seen from the normal direction of the main surface of the tilt sensor housing case 100. In the corners, one main surface of the main body part 110, the side wall 116 and the wall portion 152 are in contact with each other. Similarly, the second protrusions 126 are provided at corners so as to cover the first engaging portions 154, as seen from the normal direction of the main surface of the tilt sensor housing case 100. In the corners, the other main surface of the main body part 110, the side wall 116 and the wall portion 152 are in contact with each other.

In this way, the first protrusions 124 and the second protrusions 126 can prevent the first engaging portion 154 from directly colliding with the ground or the like even when the leveling ECU 1 is dropped during the mounting of the leveling ECU 1 to the vehicle body 300. In order to protect the substrate 400 housed in the tilt sensor housing case 100, or the tilt sensor 410 and the CPU 412, which are mounted on the substrate 400, from the impact applied from the outside, the tilt sensor housing case 100 is preferably formed of a material having relatively high rigidity, such as PBT (Polybutyrene Terephthalate). Further, the deformation of the tilt sensor housing case 100 can be suppressed when the tilt sensor housing case 100 is formed of the material having high rigidity. In this way, the distortion of the substrate 400 and the posture change of the tilt sensor 410 due to the distortion can be suppressed. Since the posture of the tilt sensor 410 can be stably held, it is possible to improve the accuracy of the auto-leveling control.

On the other hand, in the case of being formed of a material having high rigidity, the impact resistance of the tilt sensor housing case 100 tends to be lowered. Accordingly, the tilt sensor housing case 100 can be easily broken by impact or the like when dropped. In particular, since the first engaging portions 154 of the lid part 150 are provided at corners of the tilt sensor housing case 100, the first engaging portions 154 directly collide with the ground or the like and tend to be easily broken when the tilt sensor housing case 100 is dropped. As a method for preventing the breakage of the first engaging portions 154, it is considered to improve the impact resistance by increasing a thickness of the first engaging portions 154. However, since the first engaging portions 154 and the second engaging portions 120 are engaged with each other by the uneven lance engagement, it is difficult to mount the lid part 150 to the main body part 110 when the thickness of the first engaging portions 154 is increased. Or, the first engaging portions 154 are easily damaged during the uneven lance engagement. On the contrary, in the present embodiment, the first protrusions 124 and the second protrusions 126 are provided in a state of interposing the first engaging portions 154 therebetween. In this way, the first engaging portions 154 can be prevented from directly colliding with the ground or the like when the tilt sensor housing case 100 is dropped. Accordingly, it is possible to prevent the damage to the first engaging portions 154 without sacrificing the easy mounting of the lid part 150 to the main body part 110. As a result, the tilt sensor housing case 100 can be less damaged.

In order to protect the first engaging portions 154, the first protrusions 124 and the second protrusions 126 can be protruded at least up to the same height as the first engaging portions 154 in the lateral direction of the tilt sensor housing case 100. Here, the first engaging portions 154 can be more securely protected when the first protrusions 124 and the second protrusions 126 are protruded to the outside of the first engaging portions 154. The same applies to the end surfaces on the lid part 150 side of the first protrusions 124 and the second protrusions 126. That is, the first engaging portions 154 can be more securely protected when theses end surfaces are protruded to the outside of the wall portion 152.

Further, in the first protrusions 124 and the second protrusions 126, the portions protruded to the outside of the first engaging portions 154 and the portions protruded to the outside of the wall portion 152 can be used as a crushing margin. Namely, when the leveling ECU 1 is dropped and thus the first protrusions 124 and/or the second protrusions 126 collide with the ground, the portions of the first protrusions 124 and/or the second protrusions 126, which are protruded to the outside, are deformed. Therefore, it is possible to know the presence or absence of the dropping of the leveling ECU 1 by visually confirming whether the first protrusions 124 and the second protrusions 126 are deformed or not.

Further, as shown in FIG. 5, the substrate 400 is disposed at a position offset from the center of the main body part 110 in a vertical direction of the tilt sensor housing case 100. Namely, the guide rails 118 are disposed at a position offset from the center in a vertical direction of the main body part 110. For example, in order to secure a housing space for the tilt sensor 410 or the like that is mounted on the substrate 400, the substrate 400 and the guide rails 118 are located to be offset from the center so that a space on a substrate surface side for mounting the tilt sensor 410 or the like is widened. Further, the first engaging portion 154 has a shape that the second arm portion 154b close to the guide rail 118 is thicker than the first arm portion 154a. When the leveling ECU 1 is dropped and collides with the ground or the like, the substrate 400 may press the lid part 150 from the inside. At this time, a force applied to the lid part 150 by the pressing of the substrate 400 tends to be concentrated in the first engaging portion 154. Especially, there is a tendency that the force is concentrated in the second arm portion 154b closer to the substrate 400. Therefore, the second arm portion 154b is formed to be thicker than the first arm portion 154a, so that the strength of the second arm portion 154b is increased. As a result, it is possible to more securely prevent the damage to the first engaging portion 154.

Figure 6:
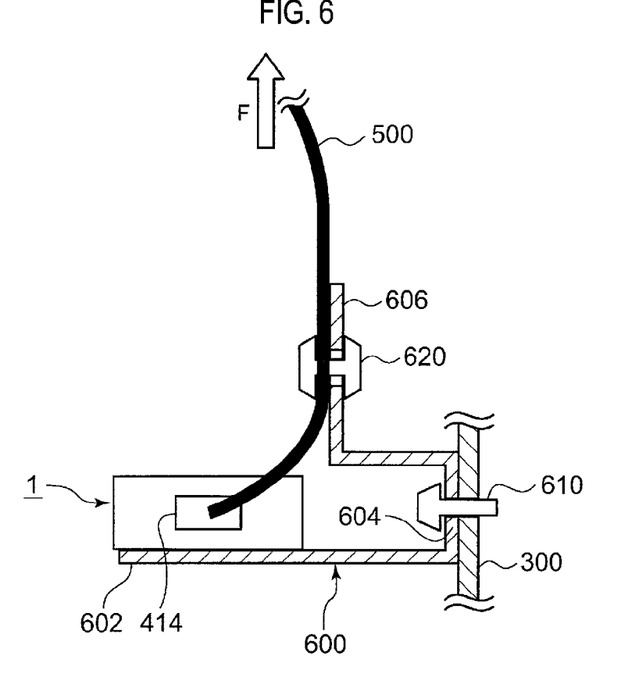
FIG. 6 is a schematic view showing a harness fixing structure.

Subsequently, a structure of fixing a harness that connects the substrate 400 and an external device will be described. FIG. 6 is a schematic view showing a harness fixing structure. The ECU bracket 600 includes an ECU mounting portion 602, a vehicle body attaching portion 604 and a harness fixing portion 606. The leveling ECU 1 is fixed to the ECU mounting portion 602 of the ECU bracket 600 through the bracket engaging portion 122 (see FIG. 4). The vehicle body attaching portion 604 is fixed to the vehicle body 300 by a fastening member 610 such as screws. In the harness 500 connected to the connector 414, a middle portion between the substrate 400 and the external device is fixed to the harness fixing portion 606 of the ECU bracket 600 by a harness fixture 620.

For example, in an assembly process or a repair process of a vehicle, there is a possibility that a worker hooks his hand or a tool or the like to the harness 500. In this case, a force F in a direction pulled toward the external device is applied to the harness 500. When the harness 500 is not fixed to the harness fixing portion 606, the force F is transmitted to the leveling ECU 1, and thus there is a possibility that the leveling ECU 1 is tilted. On the other hand, in the present embodiment, the harness 500 is fixed to the harness fixing portion 606, so that the force F applied to the harness 500 is transmitted only to the harness fixing portion 606. Accordingly, it is possible to prevent the tilting of the leveling ECU 1 due to the pulling of the harness 500. As a result, it is possible to suppress the accuracy of the auto-leveling control from being lowered. Meanwhile, the harness 500 may be directly fixed to the vehicle body 300.

As described above, the tilt sensor housing case 100 according to the present embodiment includes the main body part 110 having the second engaging portion 120 on the side wall 116 and the lid part 150 having the first engaging portion 154 extending along the side wall 116. Further, the lid part 150 is mounted to the main body part 110 by a snap-fit coupling using the elasticity of the lid part 150 and fixed to the main body part 110 by the engagement of the first engaging portion 154 and the second engaging portion 120. Further, the main body part 110 includes the first protrusion 124 and the second protrusion 126. The first engaging portion 154 is located between the first protrusion 124 and the second protrusion 126. The first protrusion 124 and the second protrusion 126 protrude to the extension range of the first engaging portion 154, as seen from the normal direction of the main surface. Accordingly, the first protrusion 124 and the second protrusion 126 can prevent the first engaging portion 154 from directly colliding with the ground or the like. As a result, the tilt sensor housing case 100 can be less damaged.

Further, the first engaging portion 154 has the engaging claw and the second engaging portion 120 has the engaging protrusion. The engaging claw and the engaging protrusion are engaged with each other by an uneven lance engagement. In this way, the lid part 150 can be simply locked to the main body part 110. Further, the first engaging portion 124 and the second engaging portion 126 are disposed in the vicinity of the first engaging portion 154. Therefore, the first engaging portion 124 and the second engaging portion 126 serve as a guide rail of the first engaging portion 154 when the lid part 150 is mounted to the main body part 110. In this way, the uneven lance engagement of the first engaging portion 154 and the second engaging portion 120 can be made more simply. Accordingly, an operation of mounting the tilt sensor housing case 100 can be easily carried out. Further, the first engaging portion 154 has a shape that the second arm portion 154b close to the guide rail 118 is thicker than the first arm portion 154a. Thereby, it is possible to more securely prevent the damage to the first engaging portion 154.

A vehicle lamp system is configured by the lamp unit 10 as the vehicle lamp having the optical axis O that can be adjusted, the tilt sensor housing case 100 described above, the tilt sensor 410, and the CPU 412 as the control device. As described above, the tilt sensor housing case 100 has a structure that is less damaged. Therefore, the tilt sensor housing case 100 can hold the substrate 400 with high positional accuracy. As a result, it is possible to improve the accuracy of the auto-leveling control of the lamp unit 10 as the vehicle lamp.

The present invention is not limited to the above-described embodiment and modifications such as various design changes may be added to the above-described embodiment, based on the knowledge of those skilled in the art. The embodiments to which such modifications are added are also included in the scope of the present invention. New embodiments obtained by combinations of the above-described embodiment and the modifications include effects of each of the above-described embodiment and the modifications, which are combined.

In the above-described embodiment, the acceleration sensor is used as the tilt sensor 410. However, the tilt sensor 410 may be a gyro sensor (an angular velocity sensor and an angular acceleration sensor) or a geomagnetic sensor or the like.

In the above-described embodiment, the first engaging portion 154 provided in the lid part 150 has the engaging claw and the second engaging portion 120 provided in the main body part 110 has the engaging protrusion. However, the first engaging portion 154 may have the engaging protrusion and the second engaging portion 120 may have the engaging claw.

What is claimed is:
1. A tilt sensor housing case comprising:
a main body part comprising a housing space for a substrate on which a tilt sensor is mounted and an opening portion for inserting the substrate in the housing space; and
a lid part configured to close the opening portion,
wherein the lid part has a first engaging portion extending along an outer surface of the main body part in a state where the lid part is mounted to the main body part,
the main body part has a second engaging portion on the outer surface corresponding to the first engaging portion,
the lid part is mounted to the main body part by a snap-fit coupling using the elasticity of the lid part and locked to the main body part by the engagement of the first engaging portion and the second engaging portion, and
the main body part has a first protrusion and a second protrusion that are positioned to sandwich the first engaging portion between them in a state where the lid part is mounted to the main body part, and each of the first and second protrusions protrudes at least up to the same height as the first engaging portion in a direction in which the outer surface and the first engaging portion are overlapped.
2. The tilt sensor housing case according to claim 1, wherein one of the first engaging portion and the second engaging portion has an engaging claw and the other thereof has an engaging protrusion protruding toward the first engaging portion, and the first engaging portion and the second engaging portion are engaged with each other by an uneven lance engagement of the engaging claw and the engaging protrusion.

3. The tilt sensor housing case according to claim 2, wherein the main body part comprises a guide rail on an inner surface in contact with the housing space, the guide rail extending in an insertion direction of the substrate and supporting an edge of the substrate, the engaging claw has a first arm portion, a second arm portion and a connecting portion connecting leading ends of the first arm portion and the second arm portion, the first arm portion and the second arm portion being spaced apart in a direction perpendicular to the insertion direction and extending in the insertion direction, and one of the first arm portion and the second arm portion, which is close to the guide rail, is thicker than the other of the first arm portion and the second arm portion.

4. A vehicle lamp system comprising:

a vehicle lamp having an optical axis that can be adjusted;

the tilt sensor housing case according to claim 1;

a tilt sensor housed in the tilt sensor housing case, the tilt senor configured to calculate a tilt angle of a vehicle; and a control device that generates information on the tilt angle of the vehicle by using an output value of the tilt sensor and controls the adjustment of the optical axis of the vehicle lamp by using the information.

* * * * *